(12) United States Patent
Högasten et al.

(10) Patent No.: US 7,795,578 B2
(45) Date of Patent: Sep. 14, 2010

(54) METHOD FOR CORRECTION OF NON-UNIFORMITY IN DETECTOR ELEMENTS COMPRISED IN AN IR-DETECTOR

(75) Inventors: Nicholas Högasten, Hägersten (SE); Peter Uddenfelt, Lidingö (SE)

(73) Assignee: SAAB AB, Linköping (SE)

( * ) Notice: Subject to any disclaimer, the term of this patent is extended or adjusted under 35 U.S.C. 154(b) by 54 days.

(21) Appl. No.: 12/293,190

(22) PCT Filed: Mar. 14, 2007

(86) PCT No.: PCT/SE2007/000243
§ 371 (c)(1),
(2), (4) Date: Jan. 21, 2009

(87) PCT Pub. No.: WO2007/106018
PCT Pub. Date: Sep. 20, 2007

(65) Prior Publication Data
US 2009/0230293 A1    Sep. 17, 2009

(30) Foreign Application Priority Data
Mar. 16, 2006    (SE)    .................................... 0600574

(51) Int. Cl.
*G01D 18/00* (2006.01)
(52) U.S. Cl. .................................................. 250/252.1
(58) Field of Classification Search .............. 250/252.1, 250/336.1, 338.1, 349, 350; 382/254
See application file for complete search history.

(56) References Cited
U.S. PATENT DOCUMENTS 5,323,334 A  *  6/1994  Meyers et al. .................. 702/94
5,514,865 A      5/1996  O'Neill
6,723,992 B1    4/2004  Bastiaans

FOREIGN PATENT DOCUMENTS

WO    WO-0103423 A1    1/2001

OTHER PUBLICATIONS

PCT/ISA/210—International Search Report—Jun. 18, 2007.

* cited by examiner

*Primary Examiner*—David P Porta
*Assistant Examiner*—Marcus H Taningco
(74) *Attorney, Agent, or Firm*—Venable LLP; Eric J. Franklin

(57) ABSTRACT

A method for correction of non-uniformity in signal level in different image points in an IR-camera, based on a scene being observed during movement in time of detector elements, of a camera in which the detector elements are arranged and/or of the scene, with deviating output signals for the same energy in the scene measured by different detector elements being corrected for image interference so that they provide essentially the same output signal. Micro-mechanical gyros are introduced that measure the angular velocity parallel to and perpendicular to the optical axis of the scene. The measured movement is used as an estimate for calculating the movement with a movement estimation method based on scene data. The estimated movement is coordinated with an associated image. The difference between the most recent image and the immediately preceding image or the average value of a plurality of preceding images is calculated as offset parameters. The offset parameters are updated by correction of previous offset parameters with the most recent offset parameters. The most recent image is corrected for static noise by applying the most recently produced offset parameters to the most recent image.

7 Claims, 2 Drawing Sheets

METHOD FOR CORRECTION OF NON-UNIFORMITY IN DETECTOR ELEMENTS COMPRISED IN AN IR-DETECTOR

CROSS-REFERENCE TO RELATED APPLICATIONS

This application claims priority to Swedish patent application 0600574-8 filed 16 Mar. 2006 and is the national phase under 35 U.S.C. §371 of PCT/SE2007/000243 filed 14 Mar. 2007.

The present invention relates to a method for correction of non-uniformity in signal level in different image points comprised in an IR-camera, based on a scene being observed during movement in time of detector elements, of a camera in which the detector elements are arranged and/or of the scene, and with deviating output signals for the same energy in the scene measured by different detector elements being corrected so that they provide the same output signal.

For IR-detectors in general, non-uniformity in detector elements is a problem that must be dealt with. Different elements have different responses and different signal levels. These differences can largely be removed by calibration in production by measuring the signal at two or more known temperatures and correcting the response (gain) and signal level (offset) for all the detector elements so that they provide the same output signal at the same temperature. This calibration is often insufficient. A known way of improving the calibration during operation is to introduce a so-called spade that is assumed to maintain an even temperature and that can be inserted in front of the detector in order to calibrate this for the current conditions. This method has, however, the disadvantages that are listed below and, in addition, is associated with relatively high costs.

So-called "fixed pattern noise" or static noise arises in IR images for the following reasons, among others:

The response is not completely linear within the calibrated range, which gives minor deviations.

Certain detectors can change behaviour over time.

Temperature differences between the calibration time and later use affect the signal levels.

Optics, mechanics and electronics vary in position and temperature and this affects the signal read off from the detector elements differently and accordingly gives rise to image irregularities.

In order to deal with this, a new offset calibration is carried out for each occasion of use. This is carried out by an object with an even temperature being inserted in front of the detector. All the signal levels are then corrected so that they provide the same output signal. For practical and mechanical reasons, a "spade" is normally inserted in front of the detector to act as an object with even temperature. This usually provides an acceptable image. The disadvantages of this method are, among other things, that:

For practical reasons, the spade cannot be positioned outside the camera. The interference that is introduced on account of the position and temperature of optics and mechanics that are not situated between the spade and the detector will not be corrected.

The imaged scene can have a temperature that differs greatly from the temperature of the "spade". If the sensor elements do not have completely linear responses for all temperatures, this will introduce interference into the image.

The spade costs money.

When the spade is inserted, the image is lost.

The spade does not have a completely homogenous temperature.

The spade is mechanically complicated and can, for example, seize up in extreme cold.

The camera's response is sometimes limited by the need to be able to handle an extremely hot spade that actually lies outside the temperature range that is of interest.

A plurality of methods are also known for scene-based correction of non-uniformity in detector elements. In this connection, the term "scene-based NUC" is often used, with NUC standing for Non Uniformity Correction. By means of these known methods, inserted objects in the form of spades can be completely or at least partially omitted. Put simply, the methods can be said to be based on energy from the same point in a scene being sampled by several different detector elements. The samplings originate from different times and the camera and/or the scene is moving. The energy is assumed to be constant over a short interval of time and if different detector elements give different output signals for the same energy, this is due to some interference that must then be corrected. Two main methods have been described.

1 The detector is moved (for example in a so-called micro-scanning system)

2 Camera movements and/or scene changes are measured by any image-based movement estimation method (so-called optical flow).

According to the concept of the invention, it is proposed to measure the movement by means of micro-mechanical gyros that measure the angular velocity parallel to and perpendicular to the optical axis of the scene, to coordinate the measured movement with an associated image, to calculate the difference between the most recent image and the immediately preceding image or the average value of a plurality of preceding images as offset parameters, to update the offset parameters by correction of previous offset parameters with most recent offset parameters and to correct the most recent image for static noise by applying the most recently produced offset parameters to the most recent image.

Solid state rate gyros are advantageously used as micro-mechanical gyros. Such gyros have an advantageous price and relatively small volume and low weight. Particularly recommended are solid state rate gyros manufactured using MEMS technology, with MEMS standing for micro-electro-mechanical-system.

In order to improve still further the performance of gyros comprised in the arrangement, these can be calibrated during operation. Such a calibration can involve the scaling factor being adapted individually for each gyro comprised in the arrangement and can involve the gyros being continually compensated for the temperature variation. In addition, the drift of the gyros can be compensated for continually and calibration can be carried out by means of low-pass filtering when the gyro is stationary. The criterion for there being no movement can be obtained from a movement estimation algorithm based on image data with high correlation.

In addition, the angular movement obtained from the gyros can be used as an estimate for calculating the movement using a different movement estimation method based only on image data. The two results can be compared and the gyro can be compensated for angular drift and scaling factor error.

A suitable method according to the invention is characterized in that the measured movement is used as an estimate for calculating the movement using the movement estimation method based on scene data. For each new image, it is thus possible to obtain from the gyro a delta angle in relation to the preceding image that can be used as a good estimate for a movement estimation method based on image data.

If the correlation between the estimate based on the gyro signals and the movement estimation method based on scene data gives a different result to the gyro signals, the evaluated reliability for the movement estimation method based on scene data can be used as a basis for how data is used.

Thus the method proposes in a reliability situation that the calibration parameters of gyros comprised in the arrangement are corrected if the correlation with the movement estimation method based on scene data gives a different result to the gyro signals and the movement estimation method based on scene data is considered to be reliable. In a different reliability situation, it is proposed that only gyro data is used if the movement estimation method based on scene data is judged to be unreliable.

The invention will be described below in greater detail in the form of an exemplifying embodiment with reference to the attached drawings, in which.

Figure 1:
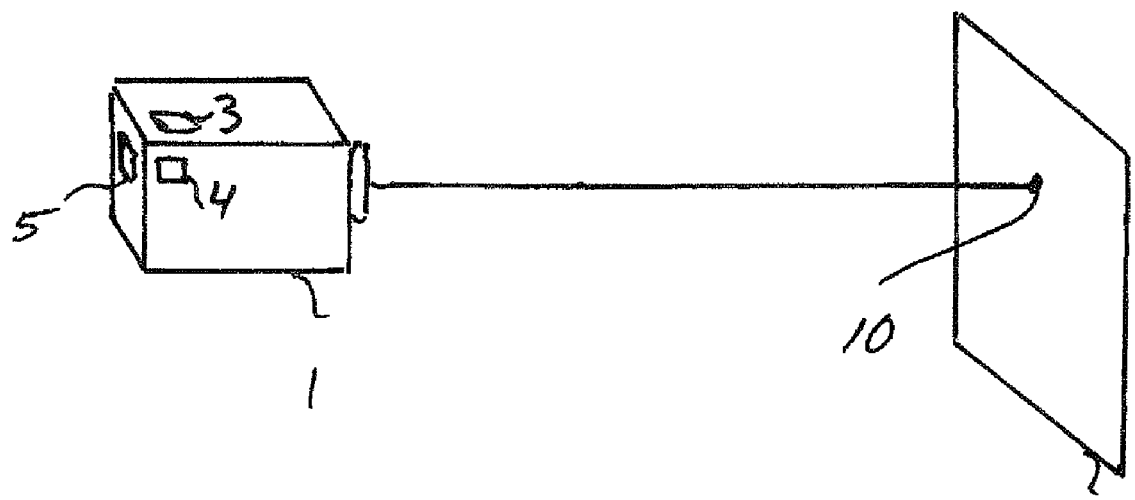
FIG. 1 shows schematically an example of equipment with a camera that is provided with gyros in association with a scene for carrying out the method according to the invention.
Figure 2:
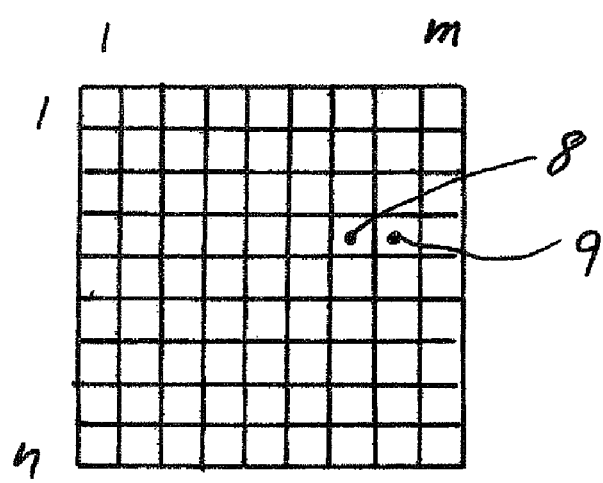
FIG. 2 shows schematically an example of a detector that can be comprised in the camera according to FIG. 1.

According to FIG. 1, a camera 1 is arranged pointing towards a scene 2. The camera can, in principle, move in three-dimensional space. In order to measure the movements of the camera in relation to the scene, which in this example is assumed to be fixed, the camera is provided with three gyros 3, 4 and 5. A detector 6 comprised in the camera is shown in FIG. 2. The detector 6 comprises a plurality of detector elements, here arranged in m columns and n rows.

If we now assume that the detector element 8 receives a signal S8 from the point 10 in a first camera position and that, at a later time, the detector element 9 receives a signal S9 from the same point when the detector element 9 has assumed the previous position of the detector element 8, in principle the signals S8 and S9 should be the same size. If this is the case, it is a clear indication that the two detector elements 8 and 9 are well-calibrated in relation to each other. If S8 and S9 differ, this can instead be an indication that calibration is required. By capturing the signals from detector elements comprised in the arrangement at different times and hence different camera and detector positions, the principles described above for two detector elements can be extended to relate to a large group of detector elements. In addition, the signals can be measured at a plurality of times and hence averaging can be applied to the measurement results.

Steps are described below for an NUC-application, showing in outline how the method can work:
1. A synchronization signal (ex. VSYNC) triggers the gyro measuring system and a momentary measurement value is obtained.
2. The measurement signal from the gyro is digitized (if required).
3 The gyro signal is corrected for temperature drift and any other known and correctable measurement errors.
4 The gyro signal (rad/s) is converted to pixel/s with scaling factors that are relevant for the specific detector resolution and specific field of view. (When zooming is carried out, the gyro signal is not of interest.) Finally, the gyro signal is converted to Δpixel in the horizontal and vertical direction. (If necessary, the angular velocity is also measured around an optical axis. These values are given in Δradians.)
5 The gyro signals are used as an estimate for any calculation-effective method for image-based movement estimation.
6 If the image-based movement estimation gives a different result to the gyro signals and the movement estimation is considered to be reliable (according to some criteria) then the calibration parameters for the gyro are corrected and drift is thereby avoided.
7 If the movement estimation based on image data is not considered to be reliable, which is the case when we have very low contrast in the image, then only corrected gyro data is used.
8 The movement for the current image is stored so that pixel data can be compared with the pixel data in a previous image or previous images depicting the same point in the scene.
9 A non-linear filter is used to calculate a weighted average value of different samples of the same point in the scene measured using several different sensor elements. If the movement is considered to be almost normally-distributed, this weighted average value can be assumed to be the "true" measurement value for the point in the scene.
10 A particular pixel's average deviation from the "true" value is assumed to originate from some interference and the value of this pixel is corrected in order to eliminate this deviation, whereby an image without static noise is obtained.

In a similar way, by varying the filter in points 9 and 10, it is possible also to eliminate temporal noise and also synthetically increase the resolution in the image by so-called "dynamic super resolution".

Figure 3:
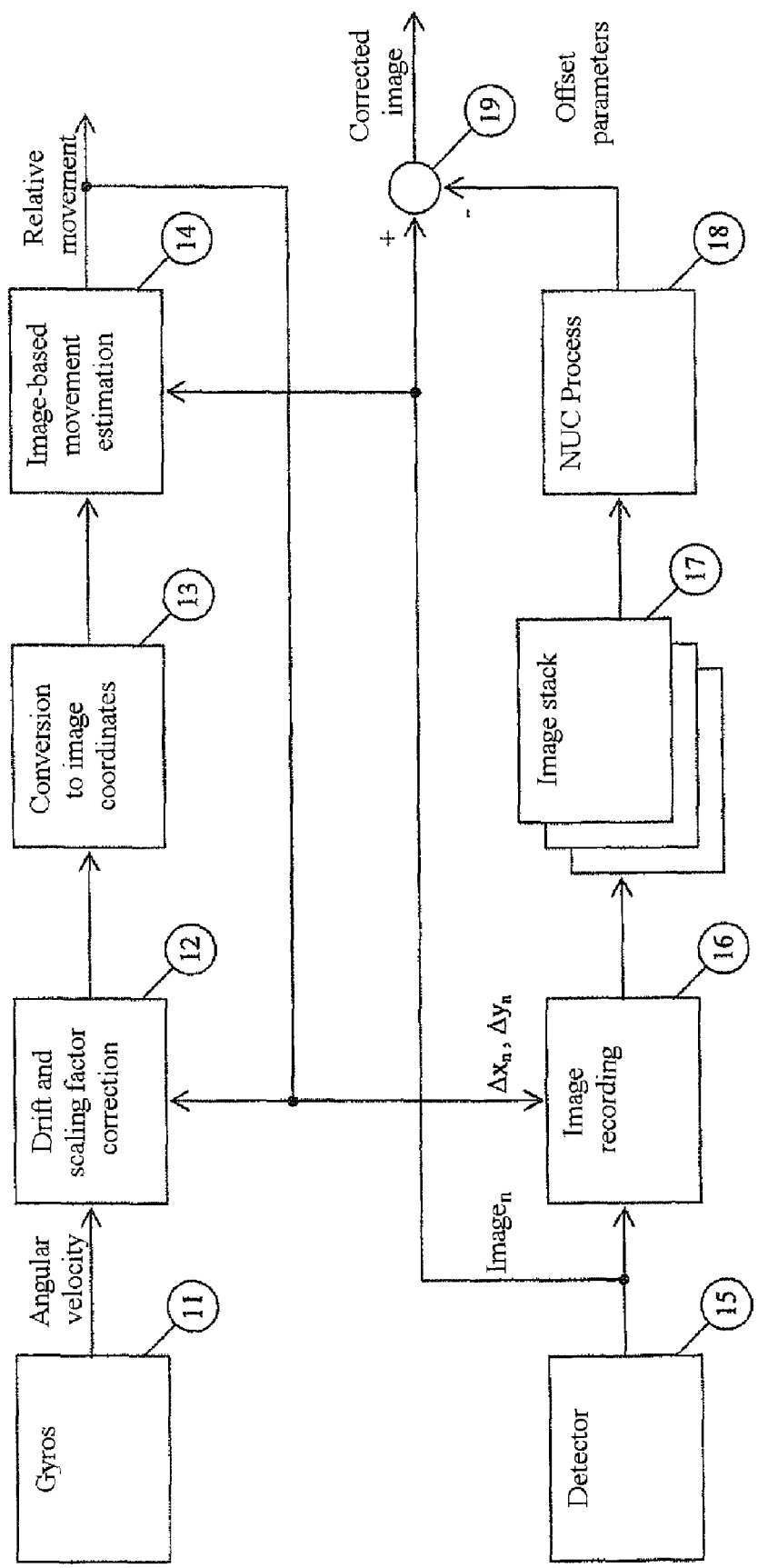
FIG. 3 illustrates schematically in the form of a block diagram how the method according to the invention can be carried out.

FIG. 3 illustrates schematically in the form of a block diagram how the method for the correction of non-uniformity in detector elements can be carried out.

Block 11 comprises gyros that supply angular changes to block 12 where correction of the drift and scaling factors of the gyros is carried out. In block 13, the angular changes are converted to image coordinates. At the output from block 13, information is obtained in the form of gyro-based relative movement between the camera and the scene/image. In block 14, an image-based movement estimation is carried out using information from the gyros as initial values. In the event of high correlation in the image estimation, output data can also be used for calibration of gyros comprised in the arrangement. In block 16, the image $Image_n$ is recorded from an image-generating system shown by means of a block 15. Recorded images $Image_n$, together with relative movement $\Delta x_n, \Delta y_n$, are stored in an image stack 17 and are later processed in an NUC process 18. The NUC process generates offset parameters based on the image information that is stored in the image stack 17. A corrected image $Image_{corr}$ is obtained by the most recent image $Image_n$ supplied by the image-generating system being corrected using the offset parameters $Offset_{tot}$ in a block 19.

The NUC process can be described as follows when the image stack consists of two images with movement between them.
1. Calculate the difference in signal for the parts of the images that overlap each other, that is the scene that is visible in both the images. This can be expressed mathematically by the relationship $Offset_n = Image_n - Image_{n-1}$.
2. Update the offset parameters for the sensor or detector elements that correspond to the overlapping part. If it is assumed that position errors and the temporal noise are normally distributed, the average value of a large number of measurements of signal differences for different sensor elements or detector elements that measure the same point in the scene will correspond to the static noise. Mathematical assumptions of the form $Offset_{tot}=0.99*Offset_{tot}+0.1*Offset_n$ can then be set up. 0.99 and 0.1 can, of course, be replaced by other values that are considered suitable, depending upon what influence the most recent offset value ($Offset_n$) is to be given.

3. Apply the accumulated offset value to the image in question so that this is corrected for static noise. This can be expressed mathematically by the relationship $Image_{corr}=Image_n-Offset_{tot}$ If a deeper image stack is used, for example seven images, the relevant offset for a sensor or detector element is calculated instead as the difference between the average value of several measurements from several sensor elements of a point in the scene and the relevant measurement with the relevant sensor element. Otherwise, the process is the same as for the case with two images.

The invention is not limited to the embodiments described above as examples, but can be modified within the framework of the following claims.

The invention claimed is:

1. A method for correcting non-uniformity in signal level in different image points comprised in an IR-camera, based on a scene that is observed during movement in time of detector elements, of a camera in which the detector elements are arranged and/or of the scene, with deviating output signals for the same energy in the scene measured with different detector elements being corrected so that they provide essentially the same output signal, the method comprising:

measuring the movement with micro-mechanical gyros that measure angular velocity parallel to and perpendicular to an optical axis of the scene, coordinating the measured movement with an associated image, calculating a difference between a most recent image and an immediately preceding image or calculating an average value of a plurality of preceding images as offset parameters, updating the offset parameters by correction of previous offset parameters with most recent offset parameters, and correcting the most recent image for static noise by applying a most recently produced offset parameters to the most recent image.

2. The method according to claim 1, wherein solid state rate gyros are used as the micro-mechanical gyros.

3. The method according to claim 2, wherein rate gyros manufactured using MEMS technology are used.

4. The method according to claim 1, wherein the gyros are calibrated during operation.

5. The method according to claim 1, further comprising:

utilizing the measured movement as an estimate for calculating the movement with a movement estimation method based on scene data.

6. The method according to claim 5, wherein calibration parameters of the gyros comprised in the arrangement are corrected if a correlation with the movement estimation method based on scene data gives a different result to the gyro signals and the movement estimation method based on scene data is considered to be reliable.

7. The method according to claim 5, wherein only gyro data is used if the movement estimation method based on scene data is considered to be unreliable.

* * * * *